Feb. 8, 1966     M. F. SANKOVICH ETAL     3,234,412
THERMIONIC CONVERSION NUCLEAR REACTOR
Filed July 21, 1961     3 Sheets-Sheet 1

INVENTORS
Melvin F. Sankovich
Paul F. Schutt
BY
ATTORNEY

Feb. 8, 1966   M. F. SANKOVICH ETAL   3,234,412
THERMIONIC CONVERSION NUCLEAR REACTOR
Filed July 21, 1961   3 Sheets-Sheet 2

INVENTORS
Melvin F. Sankovich
Paul F. Schutt
BY
ATTORNEY

Feb. 8, 1966    M. F. SANKOVICH ETAL    3,234,412
THERMIONIC CONVERSION NUCLEAR REACTOR
Filed July 21, 1961    3 Sheets-Sheet 3

INVENTORS
Melvin F. Sankovich
Paul F. Schutt
BY
ATTORNEY 3,234,412
THERMIONIC CONVERSION NUCLEAR REACTOR
Melvin F. Sankovich and Paul F. Schutt, Lynchburg, Va.,
  assignors to The Babcock & Wilcox Company, New
  York, N.Y., a corporation of New Jersey
Filed July 21, 1961, Ser. No. 125,701
3 Claims. (Cl. 310—4)

This invention relates in general to thermionic conversion wherein thermal energy is converted directly into electrical energy and, more particularly, to the employment of thermionic conversion in a nuclear reactor wherein it may be combined with a conventional indirect conversion arrangement to increase the overall thermal efficiency of the reactor system.

One of the problems that has long faced the power generating industry has been the need to improve the overall thermal efficiency of the associated generating systems. Within recent times nuclear fuel has provided a new heat source. Though this new heat source will probably some day replace the more conventional fossil fuels, since its use involves the same heat exchange processes presently used for conversion of thermal energy to electrical energy the efficiency of our power plants has not been materially improved.

The temperatures produced in the fission chain reaction are far in excess of anything obtainable from the combustion of conventional fuels, however, there still remains the problem of finding satisfactory structural materials for use at these elevated temperatures. Thus, most of our present-day thermal conversion systems are limited to temperatures far below those which are attainable from nuclear fuel. One means for increasing the efficiency of a power plant cycle is to provide an arrangement whereby the energy conversion is initiated at a higher temperature, and proceeding to the point where present conventional temperatures are reached, then reverts to the conversion of energy in more conventional heat exchange systems. In other words, superpose an elevated temperature heat interchange portion into and integrated with the presently known conventional cycles. The present invention is directed to such an arrangement wherein direct thermionic conversion of energy is combined with indirect or conventional heat energy conversion in a nuclear reactor system.

Thermionic conversion is a method for the direct conversion of heat to electricity by electron emission. In a thermionic converter, heat supplied at a high temperature has a portion of the heat converted directly into electricity, with the residual heat available for conversion into useful work at the prevailing lower temperature. The thermionic converter relies for its operation on thermionic electron emission and, therefore, must of necessity be supplied with very high temperature heat source because relatively high temperatures are required to give a reasonable amount of electron emission. For this reason nuclear fuel in a controlled fission chain reaction is particularly adaptable for use in thermionic conversion because of the high temperatures it is capable of delivering. Actually the temperatures avaliable from nuclear fuel are limited to a greater extent by the thermal and mechanical properties of the materials containing the fuel than by the fuel itself.

A thermionic converter is basically an electron tube, and its use inside a nuclear reactor requires that it be in conjunction with a reactor fuel element. In its simplest form one version of a thermionic converter consists of two electrodes of different material in a vacuum. One electrode, the cathode, is kept hot enough to emit electrons thermionically while the other electrode, the anode, is kept relatively cool. Electrons emitted from the cathode flow to the anode, then out through an electrical load and back to the cathode thereby completing the electrical circuit. It should be noted that in this process there are no moving parts.

It is possible to maintain very large temperature differences between the electrodes without excessive heat losses since nearly all of the heat transfer between electrodes is by radiation. However, when there is a high vacuum between the electrodes, considerable space charge builds up at large current densities so that the flow of electrons is restricted. This space charge is neutralized in the thermionic converter by the introduction of small amounts of an alkali metal vapor, such as cesium, which is easily ionized. These positive ions, supplied by the alkali metal, provide a neutral plasma between the cathode and anode through which the electron current can move freely. As a result of the neutralization of the space charge by the alkali metal vapor, the converter operation is relatively insensitive to electrode spacing so that practical manufacturing tolerances may be achieved.

When the alkali metal vapor is used to solve the space charge problem in the plasma chamber, the quantity of electrons passing from the cathode to the anode depends on their respective temperatures and work functions.

To understand the action of the electron flow the atomic structure of the electrodes must be considered. The electrodes consist of atoms vibrating about their equilibrium positions, with the atoms arranged in a certain geometrical pattern. Each atom consists of a positively charged nucleus and a limited number of negatively charged electrons which move in orbits around the nucleus. The number of orbits around the nucleus and the number of electrons in each orbit depend on the type of atom and vary from one metal to another.

The electrons moving in orbits close to the nucleus are more firmly bound to the nucleus than are the electrons moving in the outer orbits. Thus the attraction force between the nucleus and an electron in an outer orbit is small and the electron can move about quite freely and may leave its own orbit, entering another orbit around some other nucleus. In other words, the electrons in the outermost orbits of the atoms can move around randomly and really do not belong to any specific atom. They are the free electrons of the electrode which, upon disengagement from their orbits, produce the positive charging of the atoms.

If the electrons were at the temperature of absolute zero, the kinetic energy of the free electrons would range from zero up to a certain maximum value called the Fermi level, the kinetic energy being distributed within a number of fixed energy levels.

The electrodes, since they are of different materials, have different Fermi levels, the cathode having a low Fermi level and the anode a high Fermi level. In this circumstance a free electron leaving the cathode body and coming to rest outside of the cathode surface will require a larger additional amount of energy than would a free electron leaving the surface of the anode. Thus the free electrons in the anode Fermi level have more energy than the free electrons in the cathode Fermi level. The energy that must be supplied to cause a free electron in the cathode Fermi level, to make it leave the cathode body and come to rest just outside the cathode surface, is called the work function of the cathode. The work function is that minimum amount of energy that is required to be given to an electron so that it is able to pass through a potential barrier. In a metal electrode, as discussed here, it is the energy gap between the crest of the potential barrier and the Fermi level of the electrode material.

Since the work function of the cathode will of necessity be larger than the work function of the anode, there is a net amount of cathode induced energy available for doing work, once the electrons of the cathode have entered the anode and joined the high energy free electrons in the anode Fermi level. Thus by connecting the cathode and anode with each other by means of a lead wire and a load, power is produced by thermionic conversion when the electrons flow from the cathode, through the interelectrode gap, to the anode, and back to the cathode through the lead wire and load.

Direct thermionic conversion is basically a high temperature process, and since the heat from nuclear fission is generated at extremely high temperatures, the combined use of nuclear fuel and thermionic conversion offers a possibility of greatly improved utilization of both phenomena. Further, because the temperatures involved in the nuclear fission process are very high, the heat losses would be considerable if the heat were to be transported outside the reactor for conversion. To provide optimal efficiency, a thermionic converter should preferably be an integral part of the reactor itself, i.e., nuclear fuel should be positioned in the proximity of the cathode. At the same time a thermionic converter must be so arranged that it can contain the nuclear fuel without developing adverse nuclear characteristics which would make its use impractical.

Thermionic conversion may be advantageously employed in nuclear reactor applications. In the central power station, thermionic conversion can be combined with conventional heat conversion to provide a higher cycle efficiency for the overall unit. In power plants utilizing direct thermionic conversion of nuclear heat only, there is complete minimization of moving parts, with a desirable increase in the power/weight ratio.

Accordingly, the present invention provides an integrated nuclear reactor system which employs both direct thermionic energy conversion and indirect heat energy conversion in transforming the heat generated in the fission chain reaction into usable energy. In the reactor the core is formed by a number of thermionic conversion assemblies each of which contains a multiplicity of thermionic conversion nuclear fuel cells. The reactor vessel is provided with an inlet and an outlet so that coolant fluid can be circulated through the core to remove the residual heat remaining subsequent to the thermionic conversion phase.

Each thermionic conversion fuel cell is made up of a pair of similarly shaped thermionic conversion elements, each of which comprise a cathode and an anode arranged in closely spaced relationship to form a plasma chamber therebetween. To form the thermionic nuclear fuel cell a pair of these elements is arranged so that at least a portion of the cathods are in opposed spaced relationship with a body of nuclear fuel placed in a space provided between them. The cathodes are then joined together so that a closure is provided about the nuclear fuel. Exteriorly of this closure, means sealingly attached to the periphery of each of the elements forming the cell provide a sealed compartment about the cathodes. Gases released during the fission process are thus contained within the space between the cathodes and/or the sealed compartment about the cathodes.

A thermionic conversion nuclear fuel cell assembly comprises a multiplicity of the thermionic cells arranged between cooperating pairs of side plates between which the thermionic cells are fitted. The cells are retained within grooves so that they are in edge-to-edge relationship with the adjacent cells.

In addition this invention provides an arrangement for connecting the thermionic cells within an assembly to achieve maximum reliable service life as well as optimum power output. Initially the cells are connected in parallel to form a number of separate small basic groups. In turn these small basic groups are connected in series and then alternately in parallel-series arrangement until all of the component groups are connected to provide a single outlet from the assembly. With the basic grouping of the cells in parallel, the failure of a single cell will not prevent the remaining cells in the basic group from operating.

The various features of novelty which characterize our invention are pointed out with particularity in the claims annexed to and forming a part of this specification. For a better understanding of the invention, its operating advantages and specific objects attained by its use, reference should be had to accompanying drawings and descriptive matter in which we have illustrated and described a preferred embodiment of the invention.

Of the drawings.

In the following description of the apparatus, like reference numerals are used to refer to similar components in the various drawings.

Figure 1:
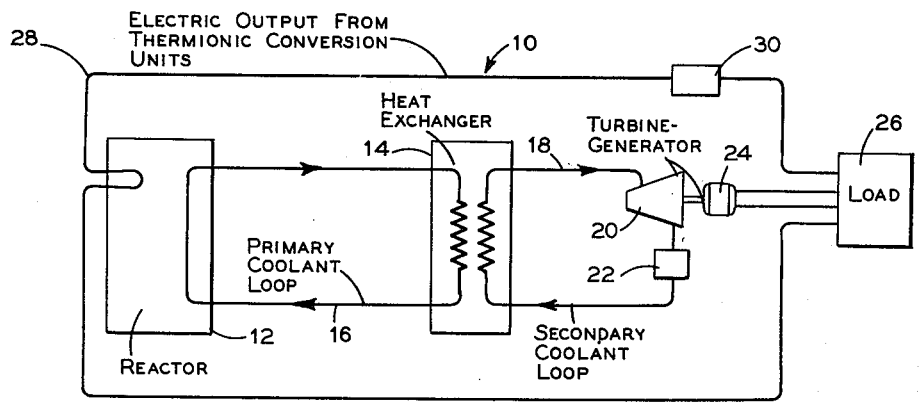
FIG. 1 is a schematic view of a nuclear reactor system embodying, in combination, thermionic and indirect heat energy conversion.

In FIG. 1 there is shown a typical reactor system 10 comprising a reactor 12 containing a core (not shown) in which a controlled fission chain reaction can be maintained. Primary coolant is circulated through the reactor 12 and heat exchanger 14 in a closed primary coolant loop 16. Within the heat exchanger 14 a secondary coolant is passed in indirect heat transfer relationship with the primary coolant. From the heat exchanger 14 the secondary coolant flows in a closed secondary coolant loop 18 to a turbine 20 and then to a condenser 22 before returning to the heat exchanger. The turbine 20 in combination with a generator 24 connected to an electrical load 26 provides the final step in the indirect conversion to usable energy of a portion of the heat generated within the reactor core.

In addition to the indirect conversion of heat energy by means of the heat exchanger 14, the turbine 20 and generator 24, heat is directly converted to energy within the reactor by means of thermionic conversion. This energy, directly converted to electricity within the reactor, is supplied to the load 26 by means of a closed electrical circuit 28 and a converter 30 which provides the desired electrical characteristics.

The reactor 12 may be either of the pressurized water or of the boiling water type. Coolant passing through the reactor is heated and then flows through the primary coolant loop to the heat exchanger where it passes in heat exchange relationship with the secondary fluid. Steam produced in the secondary coolant loop flows to the turbine 20 which in combination with the generator 24 provides electrical energy to the load 26. At the same time a portion of the heat generated within the core is converted directly to electrical energy by means of thermionic conversion cells and this energy is also delivered to the load 26 by means of electrical circuit 28.

Figure 2:
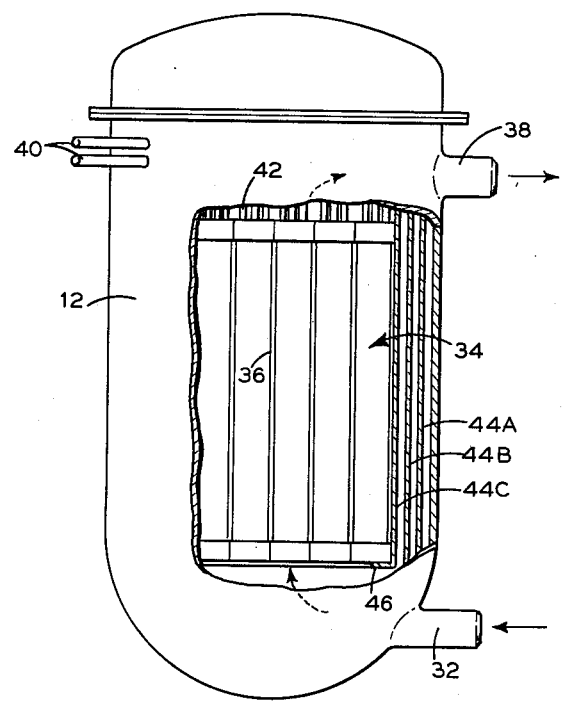
FIG. 2 is a side view, partially in section, of a nuclear reactor embodying the present invention.

In FIG. 2 a typical embodiment of the reactor 12 is shown. Coolant is supplied to the reactor from the primary coolant loop 16 in FIG. 1 through the inlet 32, flows upwardly through the core 34 formed by a number of thermionic conversion nuclear fuel cell assemblies 36, and then flows back into the primary coolant loop through outlet 38. The electrical energy developed within the thermionic conversion fuel cell assemblies 36 passes out from the reactor through connection 40 into the electrical circuit 28 of the reactor system 10 in FIG. 1.

Control of the reactor 12 may be achieved in a number of ways. As illustrated in FIG. 2 a plurality of tubes 42 extend upwardly from each of the assemblies 36. Ball control means as described in the copending application of John W. Ryon and Donald C. Schluderberg, Serial No. 29,281, filed February 28, 1961 by the common assignee, could be used in these tubes to control reactivity. Conventional control rods disposed within the core or a combination of control rods and spectral shift control could be employed also to control the fission chain reaction. Spectral shift control is described in the copending application of Milton C. Edlund, Serial No. 662,458, filed May 29, 1957 by the common assignee now Patent No. 3,081,246.

Thermal shields 44A, 44B and 44C encircle the assemblies 36 within the reactor vessel. At its lower end the inner thermal shield 44C has a lip 46 which projects radially inward and provides support for the peripheral assemblies 36 at their lower ends.

Figure 3:
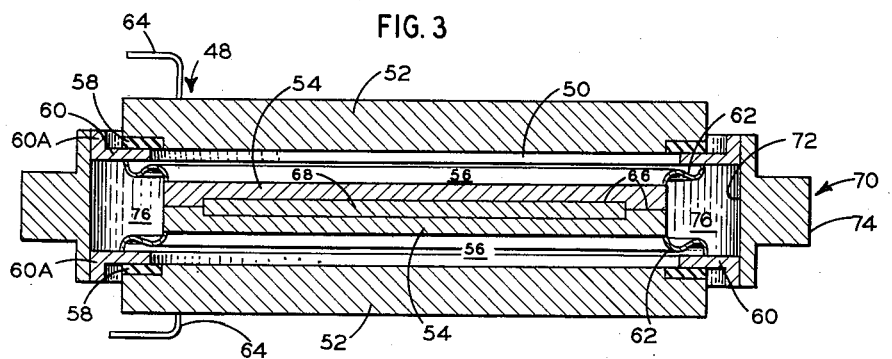
FIG. 3 is an enlarged cross sectional view of a thermionic conversion nuclear fuel cell.
Figure 4:
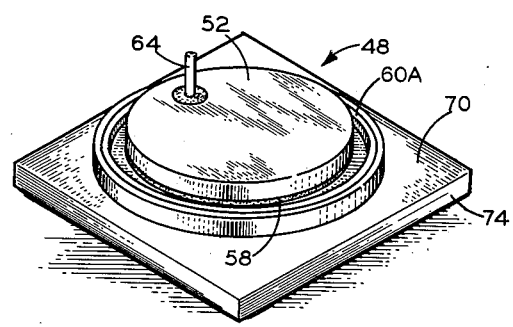
FIG. 4 is a perspective view on a smaller scale of the thermionic cell shown in FIG. 3.

Each of the assemblies 36 disposed within the reactor 12 is made up of a plurality of thermionic conversion nuclear fuel cells 48, see FIGS. 3 and 4. Each cell 48 contains a pair of thermionic conversion elements 50 which comprise an anode 52 and a cathode 54. Both the anode 52 and cathode 54 are circular in cross section and are arranged in opposed spaced relationship, forming a plasma chamber 56 therebetween. An annular shaped insulator 58 is attached to the periphery of the anode face located opposite the associated cathode. A ring 60, L-shaped in cross-section, is secured to the insulator in a manner such that it does not come in contact with the anode 52. This ring 60 extends radially outward from the periphery of the anode with its leg 60A directed away from the cathode 54. About the boundary of the plasma chamber 56 a cathode membrane 62 provides a seal for the plasma chamber and also a contact common to the cathode 54 and to the ring 60. In addition a connection 64 leads from the anode 52, tieing it into the electrical circuit.

The cell 48 is formed by two thermionic conversion elements 50 arranged so that their cathodes 54 face one another. The adjacent faces 66 of the cathodes each have a similarly shaped circular cavity formed therein. In combination these cavities form a fuel chamber 68 in which a charge of nuclear fuel is placed. The fuel, as shown in FIG. 3, may be inserted between the two cathodes in the form of a flat wafer, or it may be flame sprayed on the cathode surfaces, or introduced by other means. The fuel is placed between the cathodes to form a thermal source for the cathodes.

With the fuel in the fuel chamber 68 the outer annular surface of the cathode faces 66 are assembled in contacting relationship. The cathodes 54 may be held together by welding or by other means. It is not necessary, however, that the joint between the two cathodes be tightly sealed. The final assembly of the elements 50 into the cell 48 is accomplished by providing a cathode electrical lead member 70 which is attached to the outer surface of leg 60A of the ring 60. The cathode lead member 70 has a cylindrical inner surface 72 and a rectangular outer surface 74 as can be noted in FIG. 4. In combination with the annular rings 60, the cathode membranes 62 and the outer edges of the cathodes 54, the cathode lead member 70 forms an annular compartment 76 which encircles the cathodes 54. By sealingly attaching the cathode lead member 70 to the annulage rings 60, the space 76 forms a sealed chamber. Since the joint between the cathodes 54 is not necessarily sealed, gases developed during the fission process may escape into the space 76. One of the particular advantages of this thermionic conversion nuclear fuel cell arrangement is that by the proper selection of nuclear fuel materials and using them in the form of a solid solution of fissionable or fissionable and fertile material, the amount of fission gases released is considerably less than that released by nuclear fuels of other form. Thus the problem of fission gas disposal is greatly reduced since the space 76 is adequate to retain the gases without the necessity for providing means for their removal during reactor operation. This particular advantage simplifies the fuel cell arrangement and does away with the need for gas leak-off connections and associated equipment from each of the cells 48.

In its assembled state the cell 48 provides a single cathode lead member 70 and leads 64 from the anode 52 of each element 50 of the cell. The materials other than those required in the anode and cathode in thermionic generation should preferably combine the advantages of low neutron cross section with low electrical resistance. The outside dimensions of a typical fuel cell would be 2.25 inches square, with the outer surfaces of the anodes spaced 0.40 inch apart. The anodes have a diameter of 1.75 inches and the outer edge thickness of the cathode lead member is .125 inch.

Figure 5:
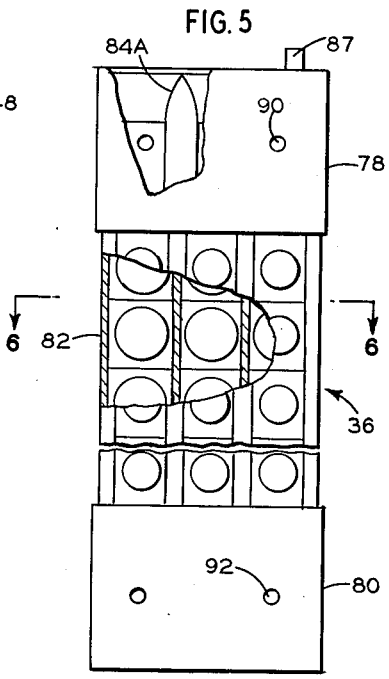
FIG. 5 is a partial side view of an assembly of thermionic conversion nuclear fuel cells shown partially in section.

Each assembly 36 is formed with an upper end adapter 78 and a lower end adapter 80 as seen in FIG. 5. Four elongated side plates 82 extend between the end adapters in parallel spaced relationship. The side plates 82 each contain a number of longitudinally extending conduits 84 formed therein which extend between the upper and lower end adapters 78, 80, respectively. Grooves 84A in the upper end adapter correspond with the conduits 84 in the side plates 82 which are located about the periphery of the assemblies 36. These grooves 84A serve to align the tubes 42 with the conduits 84 so that ball control means can be passed between the conduits and the tubes.

In addition the side plates 82 have longitudinally extending spacer blocks 85 intermittently positioned along the sides facing toward adjacent side plates. If required, these spacer blocks 85 could be continuous for the length of the side plates 82. The blocks 85 form longitudinally extending grooves 86 which extend the length of the side plates between the end adapters. The grooves 86 in adjacent side plates are positioned in opposed and aligned relationship and are sized to receive the cathode lead members 70 of the cells 48. One pair of opposed edges of each cell is arranged within the oppositely disposed grooves 86 while the other pair of opposed edges are disposed in edge-to-edge relationship with the adjacent cells within the same groove.

Figure 6:
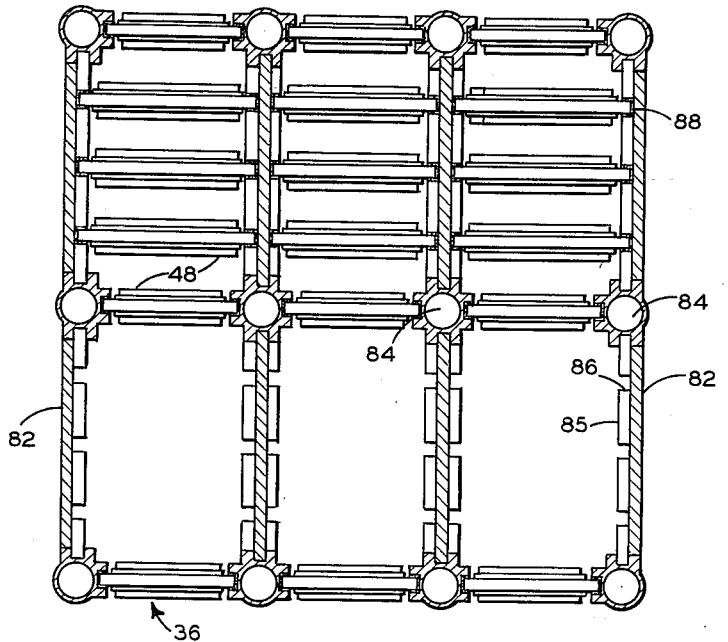
FIG. 6 is a greatly enlarged transverse cross section of line 6—6 in FIG. 5 with only some of the fuel cells shown.

The assembly 36 illustrated in FIG. 6 shows cells 48 of two different widths between side plates 82. The cells 48 which extend between those portions of the side plates containing the conduits 84 are of reduced width due to the location of the conduits.

The lateral spacing of the fuel cells within the assemblies is important to the effective operation of the reactor. If the fuel cells are spaced too far apart, the core will not go critical, and if they are spaced too closely together, the flow of the coolant will be impeded and circulation through the reactor core inadequate. Moreover, if the coolant flows through the reactor by natural circulation means, the spacing between the cells in adjacent grooves will be greater than that required for forced circulation since natural circulation requires a relatively low metal-to-water ratio.

Figure 7:
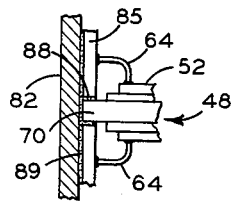
FIG. 7 is a partial transverse section showing an embodiment of the connection of the thermionic cell to the assembly.

The side plates 82 operate as support members for the cells to which the suitably insulated spacer blocks 85 are connected to serve as bus bars. In each assembly all of the cells are connected together so that a single electrical outlet 87 is provided from each assembly 36. The side plates and spacer blocks are insulated to permit selected sections of the spacer blocks to connect to specific groups of anodes. The manner in which the anodes are connected is generally as shown in FIG. 7 where the connections 64 are made to the spacer blocks 85 which are separated from the side plate 82 by insulation 89. The cathodes 54 are interconnected through the cathode lead members 70 which fit into the grooves 86. One manner of connecting the cathodes is by providing spaced connectors (not shown) in the side plates which extend through insulation 88 in the grooves 86 as shown in FIG. 6, to contact the cathode lead members. The insulation 88 is provided within the grooves to insulate the cathode lead 70 from the spacer blocks 85 which serve as the bus bars for the anodes. This insulation may be an oxide film, a ceramic coating or other type of insulation compatible with reactor operation. It will be obvious to those skilled in the art that there are numerous ways for providing connections between the anodes, their bus bars and the cathodes.

The upper and lower end adapters 78 and 80 contain bolt holes 90, 92, respectively, in each face, so that when the assemblies 36 are placed within the reactor the end adapters may be bolted together to form their own upper and lower grid plates. The lower grid, formed by bolting together the lower end adapters of the assemblies 36, is supported within the reactor on the lip 46 provided on the lower end of the inner thermal shield 44C.

As previously mentioned the conduits 84 in the side plates 82 are in register with the tubes 42 which extend upwardly above the assemblies 36, see FIG. 2. Though not illustrated, means similar to those described in the earlier mentioned application of John W. Ryon and Donald C. Schluderberg may be used to control the reactor by movement of balls containing poison materials through the tubes 42 and conduits 84. It would also be possible to space or shape the assemblies 36 so that control rods could be passed vertically through the core to provide reactor control. Further, spectral shift control as described in the earlier mentioned application of Milton C. Edlund could also be used to control the reactor.

Figure 8:
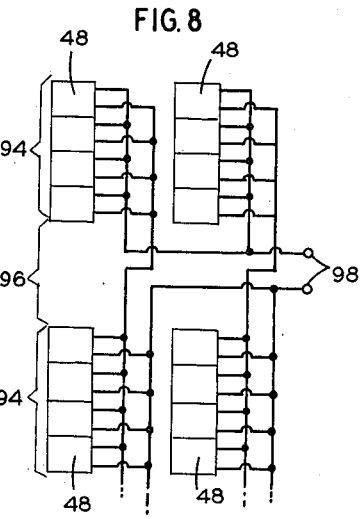
FIG. 8 is a schematic arrangement showing the manner in which the thermionic cells are connected together in an electrical circuit.

An important feature of this invention is the way in which the individual fuel cells 48 are connected together within the reactor. Because of the manner in which the fuel cells are positioned within the assemblies 36, groups of cells may be connected together in parallel or in series. As shown schematically in FIG. 8, the fuel cells 48 comprising a portion of an assembly 36 are first connected together in parallel into separate small basic groups 94. In this way, for the particular load condition on the reactor, the amperage is built up while the voltage remains substantially constant within each group. Advantageously, with this arrangement the failure of a cell 48 within a group 94 will not result in the loss of the entire group. After all the fuel cells are joined together in the separate groups 94, they are series connected together in larger groupings 96. By joining the groups 94 together in series the voltage output from the cells becomes additive while the current remains substantially constant. Starting with the groups 94 which are connected together in parallel, they are then connected together gradually in increasingly larger groups, alternatively in series and parallel generally in manner shown in FIG. 8, until all of the fuel cells within the assembly are connected into an integrated group. As shown schematically in FIG. 8, there are four separate basic groups 94 in which the cells are in parallel connection, these four groups 94 are joined together into two series connected groups 96 and these two groups 96 are connected together in parallel to form an integrated group 98. In a similar manner all of the cells 48 within an assembly 36 are connected together to provide the single outlet 87.

By properly arranging the parallel and series connections of the smaller groups within the assembly, the desired voltage and current characteristics from each assembly can be obtained. Once the fuel cells within the assemblies are all connected together providing a single connection for each assembly, the assemblies may then be linked to provide a single connection from the reactor itself if desired.

Because of the arrangement and configuration of the fuel cells 48 the electrical connections on individual cells can be made on the exterior of the cells, where the temperature is considerably less than that within the cell, thereby insuring better electrical contacts.

For a more complete understanding of the invention the manner of operation of the reaction will now be described. By operation of the ball control system for example, a fission chain reaction can be instituted within the core 34 of the reactor 12. With the start up of the chain reaction the coolant which flows through the core by way of the inlet 32 and outlet 38 passes over the exterior surfaces of the cells 48 removing residual heat caused by the nuclear chain reaction remaining after the thermionic conversion. After being discharged from the reactor the heated primary coolant flows through the loop 16 into the heat exchanger 14 where it gives up its heat in indirect heat exchange relationship, vaporizing a secondary coolant. The vaporized secondary coolant flows through the loop 18 into the turbine 20 which, in combination with the generator 24, provides electrical energy to the load 26. After its discharge from the turbine the secondary coolant passes through the condenser 22 for recirculation back through the heat exchanger 14. The primary coolant, having given up its heat within the heat exchanger, is recirculated through the reactor 12.

As the temperature rises within the fuel chamber 68 the thermionic reaction within the individual elements 50 will commence. The heat generated in the chain reaction will drive electrons from the surface of the cathode 54 across the plasma chamber 56 and into the opposing surface of the anode 52 thereby generating electricity. The output from each cell may be of the order of 2.5 amperes per square centimeter of anode surface with a potential of about one-half volt.

By selective connection of the cells 48, as previously described, the desired characteristics of amperage and current can be obtained from each assembly 36. With the assemblies 36 connected together a single outlet 40 from the reactor supplies the electrical energy converted with the cells 48 to the circuit 28. The circuit 28 then supplies the electrical energy to the load 26 first passing it through the converter 30 wherein any change of its electrical characteristics required by the load are effected.

The individual cells are parallel connected, forming comparatively small power source groups, the amperage of which is the aggregate of all of the cells, while the voltage for the group is the same as the voltage from a single cell. However, if one of the individual fuel cells were to fail, though the current output in that particular small group 94 would drop off, it would not fail completely as would be the case if series connected circuitry were used for the individual cells within a basic group.

By connecting the fuel cells first in parallel as has been described and then alternately in series and parallel until all of the fuel cells within the assembly are connected together to provide a single outlet, an arrangement is provided whereby the optimum efficiency is achieved within the assembly without loss of power amounting to any more than the loss caused by the total number of individual fuel cells which might become inoperative. In other words, the loss of one cell will not result in the enforced loss of a group of cells which might otherwise be in operating condition.

When all of the assemblies within the reactor are connected together, the thermionic power output may be taken from the reactor through a single outlet means. The electrical power which is generated directly by the thermionic conversion nuclear fuel cells, when suitably moderated may be combined with the output from the turbine-generator, or it may be used to supply a separate load source.

By combining the heat utilization of direct thermionic conversion with that of the conventional indirect heat exchange process it is possible to improve the overall thermal efficiency of the reactor considerably over that which has otherwise been achieved to date. For example, with present reactor technology it is possible to obtain a reactor thermal efficiency of about 30% by indirect conversion, whereas by the addition of direct thermionic conversion it would be increased to about 40%.

While the use of thermionic conversion in a nuclear reactor has been described and illustrated in conjunction with indirect thermal energy conversion, it will be noted by those skilled in the art that thermionic conversion alone may be used in nuclear reactors as the only means for transforming thermal energy into electrical energy.

The fuel cell of this invention lends itself to a variety of core configurations and fuel cell assemblies. Further while the fuel cell is square, as illustrated in FIG. 4, it will be appreciated by those skilled in the art that other duel cell configurations may be utilized without departing from the teaching of this invention.

Additionally, while the invention has been described in combination with a reactor of the pressurized water or boiling water type, it will be recognized that it may also be used in such other reactors as the organic cooled, gas cooled or liquid metal cooled types.

While in accordance with the provisions of the statutes we have illustrated and described herein the best forms and modes of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. A thermionic conversion nuclear fuel cell comprising a pair of similarly shaped thermionic conversion elements each capable of converting heat directly into electrical energy, each of said elements comprising a cathode and an anode connected in an electrical circuit and arranged in closely spaced opposed relationship and having a plasma chamber disposed therebetween, each of said cathodes have substantially the same surface area, and each of said anodes have substantially the same surface area, means forming a fluid-tight closure about the periphery of said plasma chamber, said elements arranged with at least a portion of the cathodes disposed in opposed closely spaced relationship, a body of nuclear fuel positioned in the space between said cathodes, means for joining said cathodes together forming a closure about said body of fuel, and means sealingly attached to the periphery of both of said elements and located outwardly from the periphery of said cathodes thereby forming a sealed compartment about said cathodes whereby fission gases released from said body of nuclear fuel are contained within said thermionic conversion nuclear fuel cell.

2. A thermionic conversion nuclear fuel cell comprising a pair of similarly shaped thermionic conversion elements each capable of converting heat directly into electrical energy, each of said elements comprising a cathode and an anode connected in an electrical circuit and arranged in closely spaced opposed relationship and having a plasma chamber disposed therebetween, said cathodes and anodes being of flat thin plate construction, means integrally attached to said cathode and anode forming a fluid-tight closure about the periphery of said plasma chamber, said elements arranged with the outer opposed surfaces of said cathodes in contacting relationship and with the inner opposed surfaces of said cathodes arranged in spaced relationship, a body of nuclear fuel positioned in the space formed between the inner opposed surfaces of said cathodes, means for joining said opposed cathodes together, and means sealingly attached to the periphery of both of said elements and located outwardly from the periphery of said cathodes thereby forming a sealed compartment about said cathodes whereby fission gases released from said body of nuclear fuel are contained within said thermionic conversion nuclear fuel cell.

3. A thermionic conversion nuclear fuel cell assembly comprising at least three elongated relatively thin side plates arranged in spaced parallel relationship, an adapter located at each end of said side plates and attached thereto to hold the side plates in position, said side plates having passageways therein extending the length thereof arranged to receive means for controlling a fission chain reaction, elongated spacer blocks extending and intermittently spaced along the length of the faces of said side plates which are disposed opposite another side plate, said spacer blocks insulated from and affixed to said side plates, said spacer blocks spaced laterally apart to form grooves extending for the length of said side plates, the grooves in opposed faces of adjacent side plates being in oppositely disposed and aligned relationship, a plurality of relatively flat rectangularly shaped thermionic conversion nuclear fuel cells arranged between each adjacent pair of said side plates, said cells having one pair of opposed edges disposed within a pair of said oppositely disposed grooves and at least one edge of the other pair of opposed edges in substantially contacting relationship with the edges of the longitudinally adjacent cell, insulation lining the surfaces of said grooves to insulate said cells from said side plates and spacer blocks, and means for providing electrical contacts between said side plates spacer blocks and fuel cells.

References Cited by the Examiner

UNITED STATES PATENTS

| 2,728,867 | 12/1955 | Wilson | 310—3 |
| 2,774,891 | 12/1956 | Dziedzilla et al. | |
| 3,008,890 | 11/1961 | Bartnoff. | |
| 3,019,358 | 1/1962 | Ohmart | 310—3 |
| 3,049,484 | 8/1962 | Zinn | 176—68 X |
| 3,093,567 | 6/1963 | Jablonski et al. | 176—39 X |
| 3,113,091 | 12/1963 | Rasor et al. | 176—39 |
| 3,179,822 | 4/1965 | Block | 310—4 |

FOREIGN PATENTS

| 37,538 | 5/1927 | Denmark. |
| 1,242,179 | 8/1960 | France. |
| 797,872 | 7/1958 | Great Britain. |

OTHER REFERENCES

Nucleonics, vol. 17, No. 7, July 1959, pp. 51–55.

Wadd Technical Report 60–699, vol. XI Radioisotope System Design, The Martin Co., September 1960, Wright Air Development Division, pp. B–78–B81.

REUBEN EPSTEIN, *Primary Examiner.*